US012789703B2

(12) United States Patent
Siswick et al.

(10) Patent No.: US 12,789,703 B2
(45) Date of Patent: Nov. 10, 2026

(54) METHOD AND APPARATUS FOR CONTROLLING A BARRIER

(71) Applicant: JAGUAR LAND ROVER LIMITED, Warwickshire (GB)

(72) Inventors: Howard Siswick, Whitley (GB); Mohammed Khan, Whitley (GB); David Waddell, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 307 days.

(21) Appl. No.: 18/263,543

(22) PCT Filed: Feb. 4, 2022

(86) PCT No.: PCT/EP2022/052680
§ 371 (c)(1),
(2) Date: Jul. 31, 2023

(87) PCT Pub. No.: WO2022/167568
PCT Pub. Date: Aug. 11, 2022

(65) Prior Publication Data

US 2024/0109488 A1 Apr. 4, 2024

(30) Foreign Application Priority Data

Feb. 5, 2021 (GB) ...................................... 2101644

(51) Int. Cl.
*B60Q 9/00* (2006.01)
*E05F 15/40* (2015.01)
(Continued)

(52) U.S. Cl.
CPC .............. *B60Q 9/008* (2013.01); *E05F 15/40* (2015.01); *E05F 15/76* (2015.01); *E05F 15/77* (2015.01);
(Continued)

(58) Field of Classification Search
None
See application file for complete search history.

(56) References Cited

U.S. PATENT DOCUMENTS 6,615,132 B1 9/2003 Nagasaka et al.
10,207,678 B2 * 2/2019 Khan ...................... B60R 25/00
(Continued)

FOREIGN PATENT DOCUMENTS

CA 2501207 A1 9/2005
CA 3011587 A1 1/2019
(Continued)

OTHER PUBLICATIONS

International Search Report and Written Opinion of the International Searching Authority for International application No. PCT/EP2022/052680 dated May 18, 2022.
(Continued)

*Primary Examiner* — Muhammad Adnan
(74) *Attorney, Agent, or Firm* — Carlson, Gaskey & Olds, P.C.

(57) ABSTRACT

N The present disclosure relates to a control system (1) for a vehicle (3) to enable communication with a moveable barrier (2)' The control system (1) includes one or more controller (12) arranged to communicate with the moveable barrier (2). The controller (12) determines a current distance (BVD) of the vehicle (3) from the moveable barrier (2). A control signal (CS-n) is generated in dependence on the current distance (BVD). The control signal (CS-n) is configured to control movement of the moveable barrier (2). Further aspects of the present disclosure relate to a moveable barrier (2); a vehicle (3) and a related method.

19 Claims, 4 Drawing Sheets

(51) Int. Cl.
*E05F 15/76* (2015.01)
*E05F 15/77* (2015.01)

(52) U.S. Cl.
CPC ..... *E05Y 2400/44* (2013.01); *E05Y 2400/458* (2013.01); *E05Y 2900/40* (2013.01)

(56) References Cited

U.S. PATENT DOCUMENTS

| | | | | |
|---|---|---|---|---|
| 11,649,652 | B2 * | 5/2023 | Crandall | A01D 34/008 49/29 |
| 2015/0266356 | A1 * | 9/2015 | Fischer | G01S 19/14 700/275 |
| 2016/0055692 | A1 * | 2/2016 | Trani | H04W 12/06 340/5.61 |
| 2019/0048644 | A1 * | 2/2019 | Lickfelt | E05F 15/73 |
| 2020/0240198 | A1 * | 7/2020 | Cate | H04W 4/022 |
| 2020/0248496 | A1 | 8/2020 | Riesebosch | |
| 2021/0010316 | A1 * | 1/2021 | Hopkins | H04W 4/44 |
| 2023/0031967 | A1 * | 2/2023 | Wolfe | E05F 3/102 |
| 2023/0249617 | A1 * | 8/2023 | Whitehouse | B60Q 9/008 340/435 |
| 2023/0289552 | A1 * | 9/2023 | Samardzija | H01Q 21/28 |

FOREIGN PATENT DOCUMENTS

| | | | | |
|---|---|---|---|---|
| CN | 110952871 | A | 4/2020 | |
| ES | 2684593 | A1 | 10/2018 | |
| GB | 2362681 | A | 11/2001 | |
| JP | 2021008756 | A | 1/2021 | |
| WO | WO-2015135630 | A1 * | 9/2015 | H04B 1/7183 |
| WO | 2020016121 | A1 | 1/2020 | |

OTHER PUBLICATIONS

Combined Search and Examination Report under Sections 17 and 18(3) for Application No. GB2101644.9 dated Jun. 11, 2021.
Communication pursuant to Article 94(3) EPC, European Application No. 22704357.7 dated Mar. 15, 2024.

* cited by examiner

METHOD AND APPARATUS FOR CONTROLLING A BARRIER

TECHNICAL FIELD

The present disclosure relates to a method and apparatus for controlling a barrier. More particularly, but not exclusively, the present disclosure relates to a control system and method for controlling movement of a moveable barrier. The present disclosure also relates to a vehicle and a barrier control unit for controlling a moveable barrier.

BACKGROUND

It is known to provide a garage for a vehicle with an electrically operated door which can be controlled remotely. A remote transmitter is typically provided to control the opening and closing of the door. The vehicle driver must locate and operate the remote transmitter to open the door as the vehicle approaches. The remote transmitter must be operated again as the vehicle departs to close the door. The driver may attempt to operate the remote transmitter while the vehicle is moving or may instead stop the vehicle while operating the remote transmitter.

At least in certain embodiments, the present invention seeks at least partially to overcome or reduce problems or limitations associated with known systems.

SUMMARY OF THE INVENTION

Aspects of the present invention relate to a control system, a vehicle, a barrier control unit, a method and a non-transitory computer-readable medium as claimed in the appended claims.

According to a further aspect of the present invention there is provided a control system for a vehicle to enable communication with a moveable barrier, the control system comprising one or more controller configured to:

- communicate with the moveable barrier to determine a current distance of the vehicle from the moveable barrier by measuring a time of flight of a signal transmitted from the moveable barrier to the control system and/or from the control system to the moveable barrier; and
- generate a control signal in dependence on the current distance, the control signal being configured to control movement of the moveable barrier.

The control system may be implemented in a vehicle. The moveable barrier may be disposed external to the vehicle. By way of example, the moveable barrier may comprise a garage door, a gate or a bollard. The moveable barrier may be operated by an actuator, such as an electric motor or other drive mechanism. The actuator may be controlled selectively to open and close the moveable barrier.

At least in certain embodiments, the one or more controller is configured automatically to control operation of the moveable barrier. The or each controller is configured to determine the current distance between the vehicle and the moveable barrier. The current distance may be referred to as a barrier-to-vehicle distance. The control signal is generated in dependence on the determined current distance. The current distance may be used a condition for controlling generation of the control signal. The control signal may request that the moveable barrier is opened or closed. By way of example, the operation of the moveable barrier open function may be permitted with the vehicle is within a predetermined range of the moveable barrier (or an associated entrance). At least in certain embodiments, this may enable automatic operation of the moveable barrier. The requirement for input from the driver may be reduced or avoided. This may enable handsfree operation of the moveable barrier.

The current distance provides an indication of a distance between the barrier and the vehicle. The control system may determine the current distance by communicating with a barrier control unit associated with the moveable barrier. For example, the one or more controller may determine the current distance by measuring a time-of-flight of a signal transmitted to the barrier control unit and/or received from the barrier control unit. Other techniques may be used to determine the current distance. The barrier control unit may be disposed in a base station. Alternatively, the barrier control unit may be incorporated into the moveable barrier. The control system may optionally apply a correction to the determined current distance, for example to account for an offset between barrier control unit and the moveable barrier.

The moveable barrier may be moveable between an open position and a closed position. The moveable barrier may pivot and/or translate between the open position and the closed position.

The one or more controller may comprise at least one electronic processor having an electrical output for outputting a control signal to control the moveable barrier. At least one memory device may be electrically coupled to the at least one electronic processor and having instructions stored therein. The at least one electronic processor may be configured to access the at least one memory device and execute the instructions therein so as to control the moveable barrier.

The one or more controller may be configured to generate the control signal in dependence on a comparison of the determined current distance to a first set distance. The first set distance may be predefined. The first set distance may be calibratable, for example the first set distance may be user-calibratable to suit a particular use case.

The one or more controller may generate the control signal in dependence on a determination that the current distance is less than or equal to the first set distance. The control signal may comprise or consist of a first control signal. The first control signal may comprise a request to displace the moveable barrier to a first position. The first position may be an open position. The first control signal may comprise or consist of an open barrier request.

The one or more controller may be configured to determine if the current distance is increasing or decreasing. For example, the one or more controller may monitor the current distance to identify changes with respect to time. The one or more controller may be configured to generate the first control signal in dependence on a determination that the current distance is less than or equal to the first set distance and the current distance is decreasing. Thus, the first control signal may be generated to request movement of the moveable barrier to the open position only when the current distance is less than the first set distance and is decreasing.

The one or more controller may be configured to generate the control signal in dependence on a comparison of the determined current distance to a second set distance. The second set distance may be predefined. The second set distance may be calibratable, for example the second set distance may be user-calibratable to suit a particular use case.

The first set distance could be the same as the second set distance. Alternatively, the first set distance and the second set distance may be different from each other.

The one or more controller may generate the control signal in dependence on a determination that the current distance is greater than the second set distance. The control signal may comprise or consist of a second control signal. The second control signal may comprise a request to displace the moveable barrier to a second position. The second position may be a closed position. The second control signal may comprise or consist of a close barrier request.

The one or more controller may be configured to determine if the current distance is increasing or decreasing. For example, the one or more controller may monitor the current distance to identify changes with respect to time. The one or more controller may be configured to generate the second control signal in dependence on a determination that the current distance is greater than the second set distance and the current distance is increasing. Thus, the second control signal may be generated to request movement of the moveable barrier to the closed position only when the current distance is greater than the second set distance and is increasing.

The one or more controller may be configured to perform an authentication process with the moveable barrier. The authentication process may comprise identification of the control system. The authentication process may comprise an electronic handshake.

The control system may comprise a transmitter. The transmitter may comprise an ultra-wideband transmitter. The ultra-wideband transmitter may be configured to transmit the notification signal over a bandwidth greater than or equal to 500 MHz.

The one or more controller may be configured to generate the control signal in dependence on a comparison of the determined current distance to a third set distance. The one or more controller may be configured to suppress generation of the control signal to control the moveable barrier in dependence on a determination that the current distance is less than or equal to the third set distance. The third set distance may be predefined. The third set distance may comprise a clearance threshold. The third set distance may be defined to ensure that there is adequate clearance available to operate the moveable barrier without impinging on the host vehicle. The third set distance may be predefined in dependence on a path followed by the moveable barrier. For example, the third set distance may be larger for a pivoting barrier than a sliding barrier. The third set distance may be less than the first set distance.

The one or more controller may be configured to generate a stop signal for inhibiting or halting operation of the moveable barrier. The stop signal may be generated if the current distance is less than the third set distance.

The one or more controller may be configured to generate a distance signal for transmission by the transmitter to notify a barrier control unit of the current distance to the vehicle. The barrier control unit may be configured to control operation of the moveable barrier in dependence on the determined current distance.

The one or more controller may be configured to generate the first control signal and/or the second control signal in dependence on a determined vehicle heading. For example, the first control signal may be generated if the vehicle heading is oriented towards the moveable barrier; and the second control signal may be generated if the vehicle heading is oriented away from the moveable barrier. This may be used in conjunction with or instead of the current distance between the moveable barrier and the vehicle.

The one or more controller may be configured to generate the first control signal and/or the second control signal in dependence on a determined geospatial location of the vehicle. The current distance between the moveable barrier and the vehicle may be determined in dependence on the determined geospatial location of the vehicle. The current distance may be determined with reference to the geospatial location of the moveable barrier. The geospatial location of the moveable barrier may be predefined or may identified with reference to a suitable positioning system. Alternatively, or in addition, the first control signal may be generated if the geospatial location of the vehicle is within a first activation zone; and the second control signal may be generated if the geospatial location of the vehicle is within a second activation zone. The first activation zone and/or the second activation zone may be predefined. This may be used in conjunction with or instead of the current distance between the moveable barrier and the vehicle.

The control signal to control movement of the barrier may be generated only if a portable device associated with the vehicle is within a predetermined distance of one or both of the barrier and the vehicle.

The control signal may be generated in response to a user request, but only if the vehicle is within a predetermined distance of the barrier.

According to a further aspect of the present invention there is provided a vehicle comprising a system as described herein.

According to a further aspect of the present invention there is provided a barrier control unit for controlling opening and closing of a moveable barrier, the barrier control unit comprising:

- a barrier receiver and a barrier transmitter for communicating with a control system of the type described herein;
- one or more controller for controlling an actuator selectively to open and close the moveable barrier, the one or more controller being configured to control the actuator in dependence on at least the first signal received from the control system, the first signal being generated in dependence on a current distance determined by measuring a time of flight of a signal transmitted from the moveable barrier to the control system and/or from the control system to the moveable barrier.

The barrier control unit could optionally be configured to control lighting in dependence on the current distance. For example, the barrier control unit may be configured to activate one or more light on vehicle approach and deactivate the one or more light on vehicle departure.

According to a further aspect of the present invention there is provided a method of controlling operation of a moveable barrier, the method comprising:

- determining a current distance between a vehicle and the moveable barrier by measuring a time of flight of a signal transmitted from the moveable barrier to the control system and/or from the control system to the moveable barrier; and
- displacing the moveable barrier to an open position or a closed position in dependence on the determined current distance.

The method may comprise comparing the determined current distance to a first set distance. The moveable barrier may be displaced to the open position in dependence on a determination that the determined current distance is less than or equal to the first set distance.

The method may comprise comparing the determined current distance to a second set distance. The moveable barrier being displaced to the closed position in dependence on a determination that the determined current distance is greater than the second set distance.

According to a further aspect of the present invention there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A control system 1 for controlling a moveable barrier 2 in accordance with an embodiment of the present invention will now be described with reference to the accompanying figures.

Figure 1:
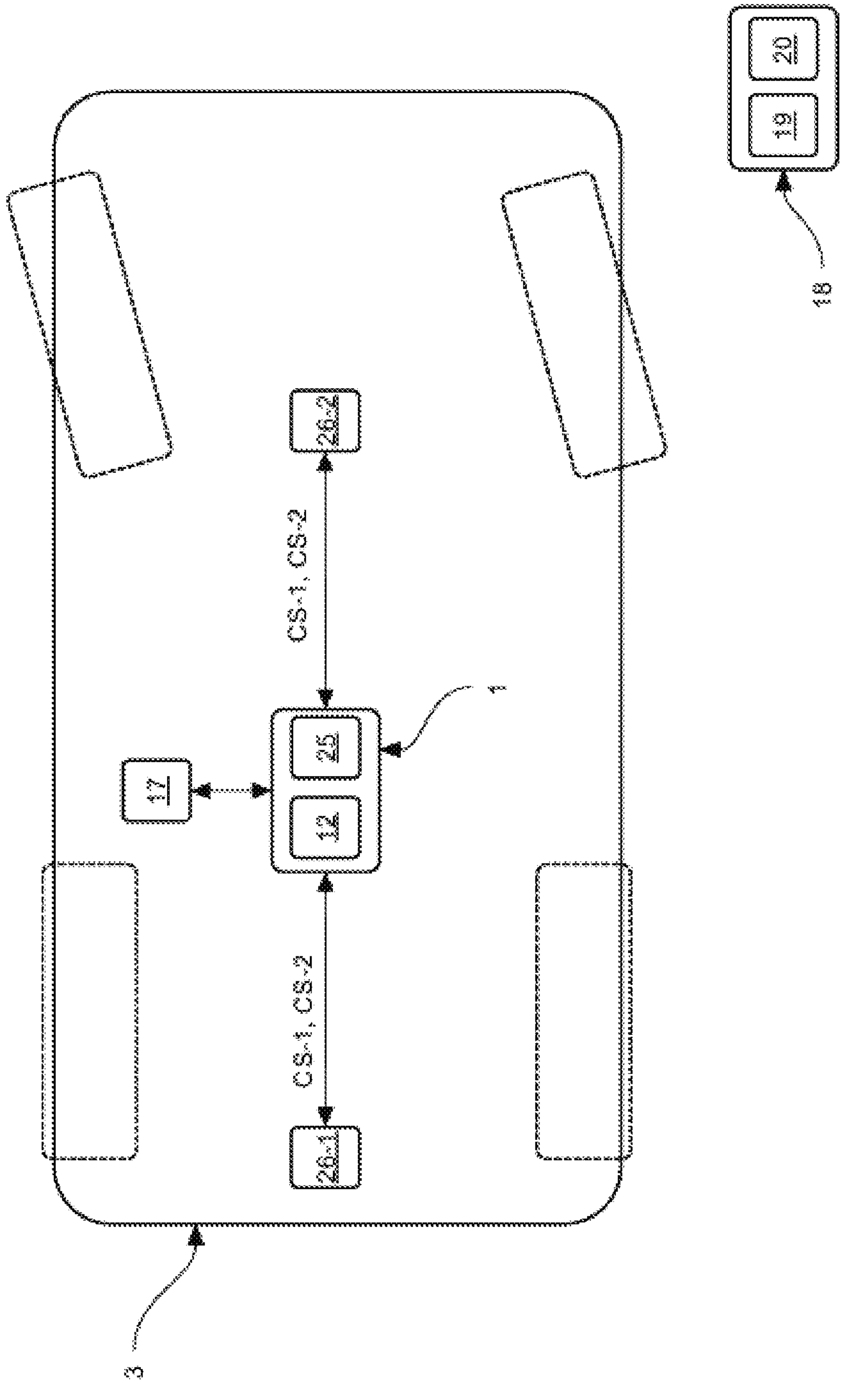
FIG. 1 shows a schematic representation of a vehicle incorporating a control system for controlling a moveable barrier in accordance with an embodiment of the present invention.
Figure 2:
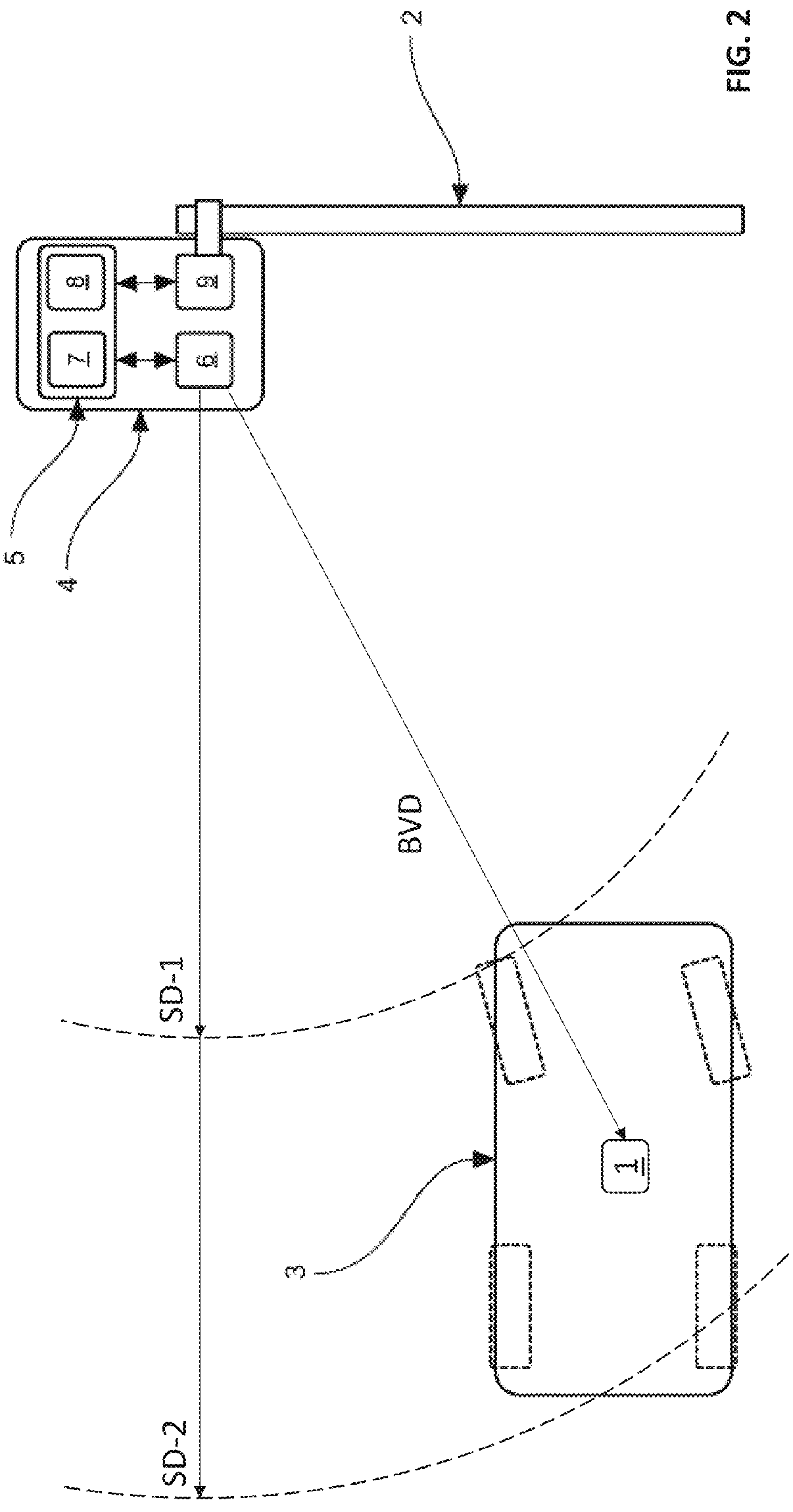
FIG. 2 shows a schematic representation of a moveable barrier and a barrier control unit for communicating with the control system shown in FIG. 1.

As shown in FIG. 1, the control system 1 is implemented in a vehicle 3 selectively to control actuation of the moveable barrier 2 (shown in FIG. 2). The moveable barrier 2 is disposed external to the vehicle 3 and may, for example, comprise a garage door or a gate. The moveable barrier 2 is electrically actuated to enable remote operation. As described herein, the control system 1 is configured automatically to control movement of the moveable barrier 2 between a closed position and an open position. The control system 1 may optionally also operate as an electronic key for controlling locking and/or unlocking of the moveable barrier 2.

The moveable barrier 2 comprises a barrier control unit 5. The barrier control unit 5 is configured to control operation of the moveable barrier 2. In particular, the barrier control unit is configured to control opening and closing of the moveable barrier 2. The barrier control unit 5 is provided in a base station 4, as shown in FIG. 2. In the illustrated arrangement, the base station 4 forms a structure for mounting the moveable barrier 2. The barrier control unit comprises a barrier transceiver 6 (or is electrically connected to a barrier transceiver 6). The barrier control unit 5 comprises at least one electronic processor 7 and a memory system 8. The barrier control unit 5 is configured to control a barrier actuator 9 which is operable to displace the moveable barrier 2 between the closed position and the open position. The barrier actuator 9 may, for example, comprise a solenoid or an electromechanical actuator. The barrier transceiver 6 is a wireless transceiver configured to transmit and receive radio frequency (RF) signals. The barrier control unit 5 is configured to transmit a wireless polling signal PS-n to communicate with the control system 1.

Figure 3:
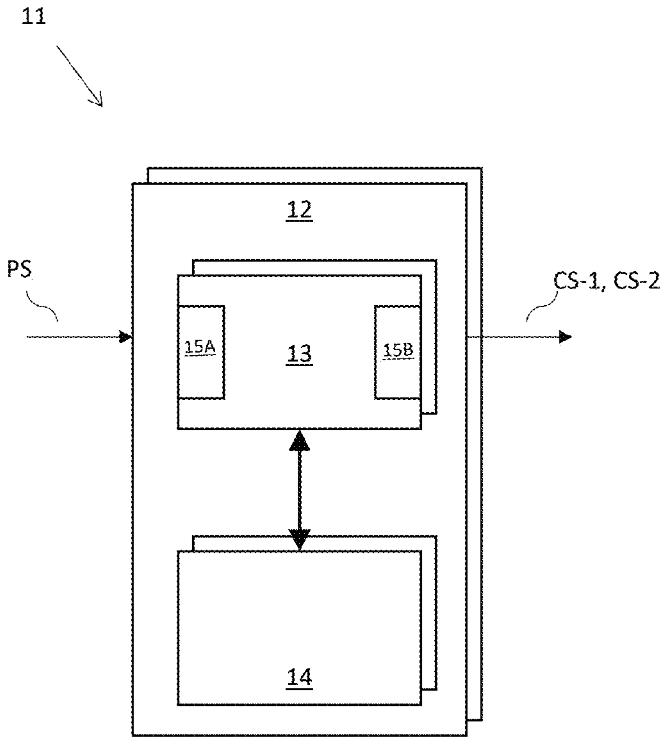
FIG. 3 shows a schematic representation of a controller for the control system shown in FIG. 1.

As shown in FIG. 3, the control system 1 comprises a control unit 11 having one or more remote controller 12 for communicating with the barrier control unit 5 to control operation of the moveable barrier 2. In particular, the remote controller 12 is operative to control displacement of the moveable barrier 2 between the closed position and the open position. In the present embodiment, the remote controller 12 is operative selectively to lock and unlock the moveable barrier 2. The remote controller 12 comprises at least one electronic processor 13 and a system memory 14. A set of computational instructions is stored on the system memory 14. When executed the instructions cause the at least one electronic processor 13 to perform the method(s) described herein. The at least one electronic processor 13 has an electrical input 15A for receiving the polling signal PS from the barrier control unit 5; and at least one electrical output 15B for outputting one or more control signal CS-n to the barrier control unit 5. As described herein, the one or more control signal CS-n controls operation of the moveable barrier 2.

The control system 1 in the present embodiment is combined with a vehicle access system (denoted generally by the reference numeral 17) provided in the vehicle 3. It will be understood that the control system 1 may be discrete from other vehicle systems, such as the vehicle access system 17. The vehicle access system 17 is configured to provide passive access to the vehicle 3 (and optionally also a passive start function). The vehicle access system 17 is configured to communicate with one or more portable devices 18 which may be carried by a person, such as a user of the vehicle 3. The portable devices 18 are in the form of a dedicated electronic key, for example in the form of key fobs or the like. In a variant, the portable device 18 may be a general-purpose computational device, such as a cellular telephone. The cellular telephone may function as an electronic key, for example by confirming user identify. The portable device 18 may be configured to execute a software application for communicating with the vehicle 3, for example to identify the portable device 18 and to establish communication with the remote controller 12. The portable devices 18 each comprise a device controller 19 and a device transceiver 20 for transmitting and receiving a wireless (RF) signal. The device transceiver 20 in the present embodiment is an ultra-wideband transceiver. The device controller 19 comprises a processor (not shown) and a memory system (not shown). In a variant, the control system 1 may be integrated into one of the portable devices 18. For example, the device controller 19 may be configured to communicate with the barrier control unit 5 to control operation of the moveable barrier 2.

The control system 1 comprises a remote transceiver 25 for communicating with the barrier control unit 5. The remote transceiver 25 is a radio frequency (RF) transceiver for transmitting and receiving wireless signals. The remote transceiver 25 may be used by the vehicle access system 17 or may be a separate unit. The remote transceiver 25 is electrically connected to one or more antenna 26-*n* disposed on the vehicle 3. In the present embodiment, the remote transceiver 25 is connected to first and second antennas 26-1, 26-2 disposed in discrete locations spaced apart from each other. The remote transceiver 25 is a radio frequency (RF) transceiver operable to communicate with the barrier control unit 5, for example to receive the polling signal PS and to transmit the control signals CS-n. The remote transceiver 25 may be a Low Frequency (LF) transmitter (operating at a radio frequency (RF) in the range 30-300 kHz); or an ultra High Frequency (UHF) transmitter (operating at a radio frequency (RF) in the range 300 megahertz (MHz) to 3 gigahertz (GHz). The remote transceiver 25 may have different operating frequencies for different territories. The remote transceiver 25 may comprise up to three channels having an operating frequency of 315 MHz (±17 kHz); and/or up to three channels at 433.92 MHz (±17 kHz). A LF coil (not shown) may be provided, or optionally a 3D coil.

The use of multiple spaced apart antennas permits the geospatial location of the vehicle (relative to the barrier) to be determined. In particular, by determining a distance (based on time of flight) between each of the antennae 26-1, 26-2 and the barrier, the relative location of the vehicle to the barrier (rather than just the distance) can be determined by trilateration. A greater number of antennae, either or both at the vehicle and/or at the barrier, can be used to provide a more accurate position. In this way, the opening and/or closing of the barrier may be carried out based on a location, determined from the distance measurements. For example, the door may open only when the vehicle is determined to be within a specified geographical area.

The control system 1 is configured to receive the polling signal PS transmitted by the barrier control unit 5. The control system 1 responds to the polling signal PS by transmitting an identification code to identify the vehicle 3. The barrier control unit 5 receives the identification code and performs a check to determine if the control system 1 is authorised to operate the moveable barrier 2. The barrier control unit 5 is configured to unlock the moveable barrier 2 in dependence on successful identification of an authorised control system 1. The remote controller 12 may be authorised by identifying a pre-existing association with the barrier control unit 5 (or a pre-established digital connection). For example, the remote controller 12 may be electronically paired with the barrier control unit 5. An authentication process may be performed to authorise the remote controller 12, for example comprising sharing a unique identification code (numerical or alphanumeric) between the barrier control unit 5 and the remote controller 12.

In certain embodiments, the device transceiver 20 may comprise a low energy system suitable for local (short-range) communications, for example to a establish a wireless personal area network. The low energy system may be configured to make an initial connection with the barrier control unit 5. Alternatively, or in addition, the barrier control unit 5 may comprise a low energy system suitable for local (short-range) communications, for example to a establish a wireless personal area network.

The control system 1 in the present embodiment is configured to control operation of the moveable barrier 2 in dependence on a current barrier-to-vehicle distance BVD from the moveable barrier 2 to the vehicle 3. The current barrier-to-vehicle distance BVD may be determined with reference to a time-of-flight of a signal transmitted from the vehicle 3 to the barrier control unit 5; and/or a time-of-flight of a signal transmitted from the barrier control unit to the vehicle 3. Determining the barrier-to-vehicle distance BVD using the time-of-flight is advantageous since it may reduce accidental or malicious operation of the control system 1 beyond the local area. Also, time-of-flight distance determination is more robust against atmospheric effects. The current barrier-to-vehicle distance BVD is typically determined with reference to a (virtual) reference point on the vehicle 3. The one or more control signal CS-n generated by the electronic processor 13 is generated in dependence on the current barrier-to-vehicle distance BVD. The control system 1 transmits one or more control signal CS-n to the barrier control unit 5 in dependence on the determined current barrier-to-vehicle distance BVD. As described herein, the control system 1 compares the current barrier-to-vehicle distance BVD to one or more predetermined set distances PD-n and generates the one or more control signal S-n in dependence on the comparison. Alternatively, or in addition, the current barrier-to-vehicle distance BVD may be determined in dependence on a signal strength. A correction may be applied to the current barrier-to-vehicle distance BVD to account for any offset between the location of the barrier control unit 5 and the moveable barrier 2. Alternatively, or in addition, the position of the vehicle 3 relative to the barrier control unit 5 may be determined by trilateration (or true-range multilateration) signals transmitted between the vehicle 3 and the barrier control unit 5.

In the present embodiment, the remote controller 12 is configured to generate first and second control signals CS-1, CS-2. The first control signal CS-1 comprises a barrier open request for requesting that the moveable barrier 2 is displaced to the open position; and the second control signal CS-2 comprises a barrier close request for requesting that the moveable barrier 2 is displaced to the closed position. The first and second control signals CS-1, CS-2 are generated with reference to the current barrier-to-vehicle distance BVD. The remote controller 12 is configured to compare the current barrier-to-vehicle distance BVD to a first set distance SD-1 and a second set distance SD-2. The first and second set distances SD-1, SD-2 are predefined distance values which may be the same as each other or may be different from each other. Default values may be defined for each of the first and second set distances SD-1, SD-2; or the first and second set distances SD-1, SD-2 may be calibrated for a particular application. For example, a user may calibrate the first and second set distances SD-1, SD-2 to align with their particular use requirements. The first set distance SD-1 may, for example, be defined as approximately 50 m. In a variant, the first set distance SD-1 may be defined as approximately 2 m, 5 m, 7.5 m or 10 m. The first set distance SD-1 may be the same as the second set distance SD-2, or may be different from the second set distance SD-2. The first set distance SD-1 is illustrated in FIG. 2 as being less than the second set distance SD-2. The second set distance SD-2 may, for example, be defined as approximately 75 m or approximately 100 m.

The first set distance SD-1 defines a first distance between the barrier control unit 5 and the vehicle 3 for initiating opening of the moveable barrier 2. The remote controller 12 compares the current barrier-to-vehicle distance BVD to the first set distance SD-1. If the comparison determines that the current barrier-to-vehicle distance BVD is less than or equal to the first set distance SD1, the remote controller 12 generates the first control signal CS-1. The first control signal CS-1 is transmitted by the remote transceiver 25 to the barrier control unit 5. In dependence on the first control signal CS-1, the barrier control unit 5 is configured to control the barrier actuator 9 to displace the moveable barrier 2 to the open position. The control system 1 may thereby operate automatically to open the moveable barrier 2. At least in certain embodiments, this may be performed without a specific input from a driver of the vehicle 3. The control system 1 may enable handsfree operation of the moveable barrier 2.

The second set distance SD-2 defines a second distance between the barrier control unit 5 and the vehicle 3 for initiating closure of the moveable barrier 2. The remote controller 12 compares the current barrier-to-vehicle distance BVD to the second set distance SD-2. If the comparison determines that the current barrier-to-vehicle distance BVD is greater than the second set distance SD2, the remote controller 12 generates the second control signal CS-2. The second control signal CS-2 is transmitted by the remote transceiver 25 to the barrier control unit 5. In dependence on the second control signal CS-2, the barrier control unit 5 is configured to control the barrier actuator 9 to displace the moveable barrier 2 to the closed position. The control system 1 may thereby operate automatically to close the moveable barrier 2. At least in certain embodiments, this may be performed without a specific input from a driver of the vehicle 3. The control system 1 may enable handsfree operation of the moveable barrier 2. At least in certain embodiments, the vehicle 3 may be authorised by the barrier control unit 5 only if the vehicle 3 is active (for example, the ignition is on). This may provide additional security, for example to protect against the vehicle 3 being towed to within the operation range of the barrier control unit 5 to gain unauthorised entry.

The remote controller 12 may optionally be configured to monitor the current barrier-to-vehicle distance BVD to identify changes in the current barrier-to-vehicle distance BVD. A decrease in the current barrier-to-vehicle distance BVD typically indicates that the vehicle 3 is travelling towards (vehicle approaching) the moveable barrier 2. Conversely, an increase in the current barrier-to-vehicle distance BVD typically indicates that the vehicle 3 is travelling away from (vehicle departing) the moveable barrier 2. The remote controller 12 may be configured to transmit the first control signal CS-1 in dependence on a determination that the current barrier-to-vehicle distance BVD is less than or equal to the first set distance SD-1 and is decreasing. Alternatively, or in addition, the remote controller 12 may be configured to transmit the second control signal CS-2 in dependence on a determination that the current barrier-to-vehicle distance BVD is greater than the second set distance SD-2 and is increasing. In a further variant, the remote controller 12 may be configured to determine a vehicle heading in relation to the moveable barrier 2. The vehicle heading may, for example, be defined as the orientation of the longitudinal axis of the vehicle 3 relative to the moveable barrier 2. The remote controller 12 may be configured to transmit the first control signal CS-1 in dependence on a determination that the vehicle heading corresponds to the vehicle 3 being oriented towards the moveable barrier 2. Alternatively, or in addition, the remote controller 12 may be configured to transmit the second control signal CS-2 in dependence on a determination that the vehicle heading corresponds to the vehicle 3 being oriented away from the moveable barrier 2. A still further variant may identify a geospatial location of the vehicle 3. The remote controller 12 may be configured to control generation of the first control signal CS-1 and/or the second control signal CS-2 in dependence on the determined geospatial location of the vehicle 3. The geospatial location of the vehicle 3 may be determined with reference to the barrier control unit 5, for example using trilateration (or true-range multilateration) of the signals transmitted between the vehicle 3 and the barrier control unit 5. Alternatively, or in addition, the geospatial location of the vehicle 3 may be determined by an on-board positioning system, such as a satellite navigation system. It will be understood that the remote controller 12 may control output of the first control signal CS-1 and/or the second control signal CS-2 in dependence on one or more of these parameters. For example, the remote controller 12 may reference one or more of the following operating parameters: the current barrier-to-vehicle distance BVD; a change (an increase or a decrease) in the current barrier-to-vehicle distance BVD; a vehicle heading; and a geospatial location. The vehicle heading and/or the geospatial location may be determined using any suitable known techniques, for example by communication with a satellite positioning system or triangulation with cellular communication towers.

As described herein, the remote controller 12 is configured to control operation of the moveable barrier 2. The remote controller 12 in the present embodiment is also configured to control the locking and unlocking of the moveable barrier 2. The remote controller 12 may, for example, control a lock mechanism 30 selectively to lock and unlock the moveable barrier 2. Rather than provide a separate lock mechanism 30, the barrier actuator 9 may be controlled to lock the position of the moveable barrier 2. The remote controller 12 functions as an electronic key for controlling locking and/or unlocking the moveable barrier 2.

Figure 4:
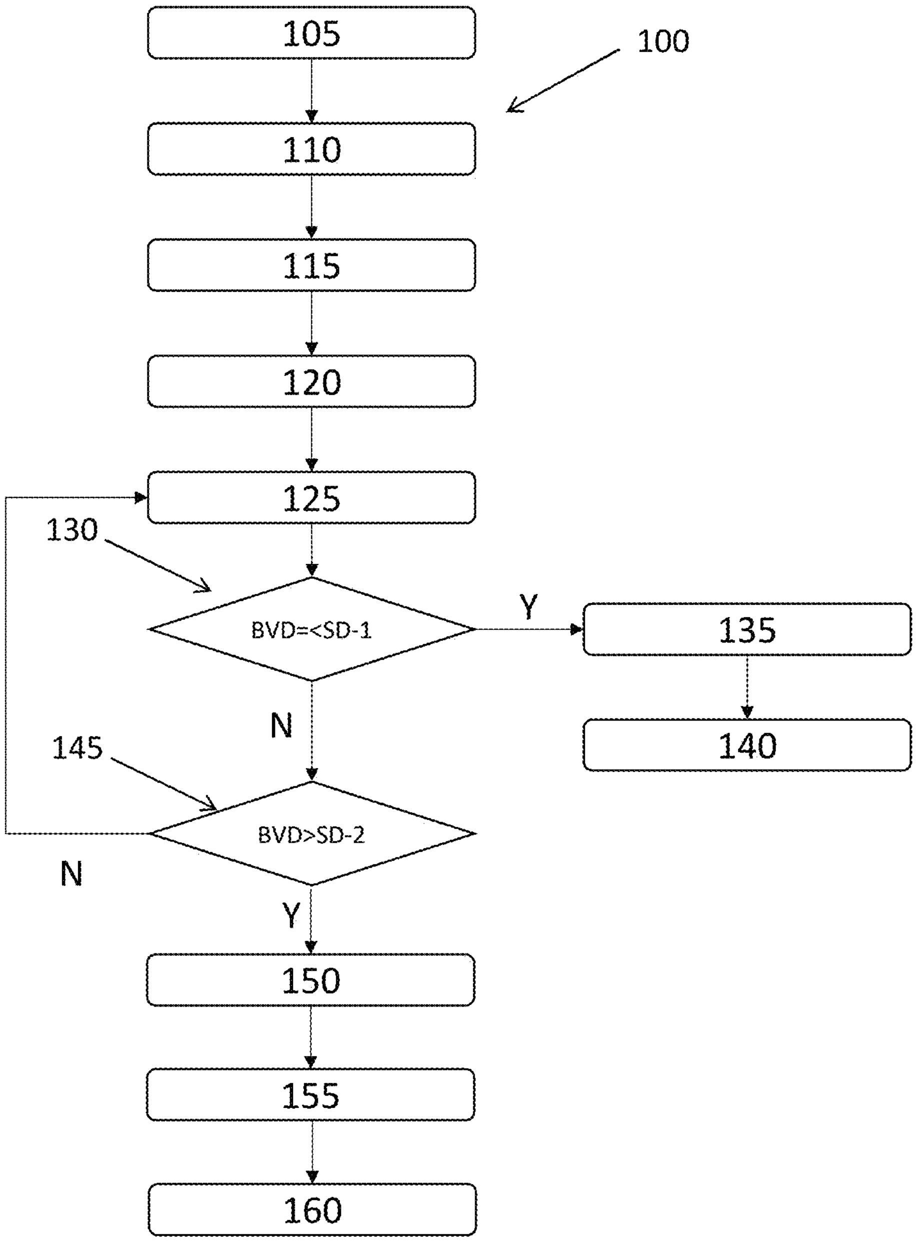
FIG. 4 shows a block diagram representing operation of the control system according to an embodiment of the present invention.

The operation of the control system 1 will now be described with reference to a first block diagram 100 shown in FIG. 4. The control system 1 is activated (BLOCK 105). The barrier control unit 5 transmits the polling signal PS (BLOCK 110). The control system 1 responds to the polling signal PS (BLOCK 115). In a variant, the control system 1 may transmit the polling signal PS (BLOCK 110); and the barrier control unit 5 may respond to the polling signal PS (BLOCK 115). The barrier control unit 5 authorises the control system 1 (BLOCK 120). The barrier control unit 5 and the control system 1 communicate with each other and the current barrier-to-vehicle distance BVD is determined (BLOCK 125). The remote controller 12 compares the current barrier-to-vehicle distance BVD to the first set distance SD-1 (BLOCK 130). If the current barrier-to-vehicle distance BVD is less than or equal to the first set distance SD-1, the remote controller 12 generates the first control signal CS-1 (BLOCK 135). The first control signal CS-1 is transmitted to the barrier control unit 5 which controls the barrier actuator 9 to displace the moveable barrier 2 to the open position (BLOCK 140). If the current barrier-to-vehicle distance BVD is greater than the first set distance SD-1, the remote controller 12 compares the current barrier-to-vehicle distance BVD to the second set distance SD-2 (BLOCK 145). If the current barrier-to-vehicle distance BVD is greater than the second set distance SD-2, the remote controller 12 generates the second control signal CS-2 (BLOCK 150). The second control signal CS-2 is transmitted to the barrier control unit 5 which controls the barrier actuator 9 to displace the moveable barrier 2 to the closed position (BLOCK 155). If the current barrier-to-vehicle distance BVD is less than the second set distance SD-2, the remote controller 12 continues to monitor the current distance. The control system 1 may be deactivated or switched to a passive mode (BLOCK 160).

It will be appreciated that various modifications may be made to the embodiment(s) described herein without departing from the scope of the appended claims. The embodiment of the control system 1 described herein generates the second control signal CS-2 to request that the moveable barrier 2 is displaced to the closed position when the current barrier-to-vehicle distance BVD is greater than the second set distance SD-2. In a variant, the moveable barrier 2 may be displaced to the closed position when the control system 1 is no longer within a communication range of the barrier control unit 5. For example, the barrier control unit 5 may close the moveable barrier 2 when the control system 1 no longer responds to the polling signal PS-n.

It will be understood that the moveable barrier 2 may include one or more proximity sensor and the like to ensure that the moveable barrier 2 does not impinge on a vehicle, object or person situated in a movement path of the moveable barrier 2. The proximity sensor(s) may provide an override signal to halt or prevent opening or closing of the moveable barrier 2.

In one alternative embodiment the polling signal may be generated by the vehicle 3 instead of by the barrier 2, with the barrier 2 responding with transmission of an identification signal when it receives the polling signal. In this case, the polling signal may only be transmitted when the vehicle is travelling below a predefined speed, to reduce current draw during periods in which it is unlikely that the vehicle will be proceeding to park or move through the barrier. Similarly, in some implementations, the polling signal may be transmitted only when the vehicle is within a predetermined geographical area (for example determined using a current GPS position of the vehicle and a geofenced area).

As explained above, the present technique may be integrated with a vehicle access system utilising a portable device 18. In some implementations automated access to the moveable barrier 2 may be contingent on the portable device 18 being one or more of in communications range of the vehicle 3, within a predetermined distance of the vehicle 3, or within a predetermined distance of the moveable barrier 2. For example, the barrier 3 may in some cases only be opened if both the vehicle 3 and the portable device 18 are found to satisfy a proximity requirement. It will be understood that time of flight distance measurements between the barrier 2 and the portable device 18 may be carried out in the same way as between the barrier 2 and the vehicle 3.

While some embodiments are intended to provide entirely automated access via the barrier, in other embodiments the distance measurement may be used to validate a manual request to open (or close) the barrier. Such a request may be made for example by way of a switch or other input control of the vehicle 3, or via the portable device 18. For example, either or both of the vehicle and the portable device 18 may provide a facility for a user to request opening (or closing) of the barrier. The request may in some embodiments only be actioned by opening (or closing) of the barrier 2 if the vehicle 3 is determined to be within a predetermined distance of the barrier at the time the request is made. This reduces the risk of unauthorised or accidental opening (or closing) of the barrier 2.

The invention claimed is:

1. A control system for a vehicle to enable communication with a moveable barrier, the control system comprising one or more controller configured to:
- communicate with the moveable barrier to determine a geospatial location of the vehicle relative to the moveable barrier by:
  - for each of a plurality of spaced apart antennas at the vehicle and/or at the moveable barrier, measuring a time of flight of a signal transmitted from the moveable barrier to the control system and/or from the control system to the moveable barrier, and
  - trilateration or true-range multilateration of the signals;
  - generate a control signal in dependence on the determined geospatial location, the control signal being configured to control movement of the moveable barrier; and
- initiate communication with the moveable barrier only when a current speed of the vehicle is less than or equal to a predefined speed threshold, and the control signal to control movement of the barrier is generated only if a portable device associated with the vehicle is within a predetermined distance of both of the barrier and the vehicle.

2. A control system as claimed in claim 1, wherein the one or more controller comprises:
- at least one electronic processor having an electrical output for outputting the control signal to control the moveable barrier; and
- at least one memory device electrically coupled to the at least one electronic processor and having instructions stored therein,
- and wherein the at least one electronic processor is configured to access the at least one memory device and execute the instructions therein so as to control the moveable barrier.

3. A control system as claimed in claim 1, wherein the generation of the control signal in dependence on the geospatial location comprises comparing the geospatial location to a first set distance whereby the control signal is generated if the geospatial location is less than or equal to the first set distance.

4. A control system as claimed in claim 3, wherein, in dependence on a determination that the geospatial location is less than or equal to the first set distance, the one or more controller generates the control signal comprising a first control signal to request movement of the moveable barrier to an open position.

5. A control system as claimed in claim 4, wherein the one or more controller is configured to determine if the geospatial location is increasing or decreasing.

6. A control system as claimed in claim 4, wherein the one or more controller is configured to generate the first control signal to request movement of the moveable barrier to the open position in dependence on a determination that the geospatial location is less than or equal to the first set distance and the geospatial location current distance is decreasing.

7. A control system as claimed in claim 1, wherein the generation of the control signal in dependence on the geospatial location comprises comparing the geospatial location current distance to a second set distance.

8. A control system as claimed in claim 7, wherein, in dependence on a determination that the geospatial location is greater than or equal to the second set distance, the one or more controller generates the control signal comprising a second control signal to request movement of the moveable barrier to a closed position.

9. A control system as claimed in claim 8, wherein the one or more controller is configured to determine if the geospatial location is increasing or decreasing.

10. A control system as claimed in claim 8, wherein the one or more controller is configured to generate the second control signal to request movement of the moveable barrier to the closed position in dependence on a determination that the geospatial location is greater than or equal to the second set distance and the geospatial location is increasing.

11. A control system as claimed in claim 1, wherein the one or more controller is configured to perform an authentication process with the moveable barrier.

12. A control system as claimed in claim 1, wherein the control system comprises a transmitter for transmitting the control signal.

13. A control system as claimed in claim 12, wherein the transmitter is configured to transmit the control signal over a bandwidth greater than or equal to 500 MHz.

14. A control system as claimed in claim 1, wherein the generation of the control signal in dependence on the geospatial location comprises comparing the geospatial location current distance to a third set distance.

15. A control system as claimed in claim 14, wherein the one or more controller is configured to suppress generation of the first control signal in dependence on a determination that the geospatial location is less than or equal to the third set distance.

16. A control system as claimed in claim 1, wherein the control signal is generated in response to a user request, but only if the vehicle is within a predetermined distance of the barrier.

17. A method of controlling operation of a moveable barrier, the method comprising:

determining a geospatial location between a vehicle and the moveable barrier by:

for each of a plurality of spaced apart antennas at the vehicle and/or at the moveable barrier, measuring a time of flight of a signal transmitted from the moveable barrier to the control system and/or from the control system to the moveable barrier, and trilateration or true-range multilateration of the signals;

generating a control signal in dependence on the determined geospatial location, the control signal configured to displace the moveable barrier to an open position or a closed position in dependence on the determined geospatial location; and initiating communication with the moveable barrier only when a current speed of the vehicle is less than or equal to a predefined speed threshold, and the control signal to control movement of the barrier is generated only if a portable device associated with the vehicle is within a predetermined distance of both of the barrier and the vehicle.

18. A method as claimed in claim 17, wherein the method comprises comparing the determined geospatial location to a first set distance; the moveable barrier being displaced to the open position in dependence on a determination that the determined geospatial location is less than or equal to the first set distance.

19. A vehicle comprising a control system to enable communication with a moveable barrier, the control system comprising one or more controller configured to:

communicate with the moveable barrier to determine a geospatial location of the vehicle relative to the moveable barrier by:

for each of a plurality of spaced apart antennas at the vehicle and/or at the moveable barrier, measuring a time of flight of a signal transmitted from the moveable barrier to the control system and/or from the control system to the moveable barrier, and trilateration or true-range multilateration of the signals;

generate a control signal in dependence on the determined geospatial location, the control signal being configured to control movement of the moveable barrier; and initiate communication with the moveable barrier only when a current speed of the vehicle is less than or equal to a predefined speed threshold, and the control signal to control movement of the barrier is generated only if a portable device associated with the vehicle is within a predetermined distance of both of the barrier and the vehicle.

* * * * *